United States Patent [19]

Svara et al.

[11] Patent Number: 4,975,254

[45] Date of Patent: Dec. 4, 1990

[54] PROCESS FOR REMOVING HYDROGEN PHOSPHIDE FROM WASTE AIR

[75] Inventors: Jürgen Svara, Cologne; Ursus Thümmler, Erftstadt, both of Fed. Rep. of Germany

[73] Assignee: Hoechst Aktiengesellschaft, Frankfurt am Main, Fed. Rep. of Germany

[21] Appl. No.: 369,731

[22] Filed: Jun. 22, 1989

[30] Foreign Application Priority Data

Jul. 6, 1988 [DE] Fed. Rep. of Germany ....... 3822777

[51] Int. Cl.$^5$ .............................................. B01D 53/36
[52] U.S. Cl. .................................................... 423/210
[58] Field of Search .................... 423/210, 304, 317; 502/344

[56] References Cited

U.S. PATENT DOCUMENTS

| | | | |
|---|---|---|---|
| 1,325,145 | 12/1919 | Davis | 423/317 |
| 4,156,697 | 5/1979 | Hestermann et al. | 423/358 |
| 4,355,010 | 10/1982 | Jodden et al. | 423/210 |
| 4,910,001 | 3/1990 | Kitahara et al. | 423/210 |

FOREIGN PATENT DOCUMENTS

| | | | |
|---|---|---|---|
| 715678 | 3/1939 | Fed. Rep. of Germany . | |
| 2286522 | 3/1986 | Japan | 423/210 |
| 3209736 | 8/1988 | Japan | 423/210 |
| 413968 | 5/1974 | U.S.S.R. | 423/210 |
| 0194366 | 9/1986 | United Kingdom | 423/210 |

OTHER PUBLICATIONS

Journal of Applied Chemistry, U.S.S.R., Dec. 10, 1987, pp. 1340–1341.
V. M. Bogdanov et al. Zhurnal Prikladnoi Khimii 60:1055–1058 (1987), Moscow.
P. G. Hall et al, Carbon 23:353–371 (1985), Great Britain.

*Primary Examiner*—Jeffrey E. Russell
*Assistant Examiner*—Stephen G. Kalinchak
*Attorney, Agent, or Firm*—Connolly & Hutz

[57] ABSTRACT

For removing hydrogen phosphide from waste air, the hydrogen phosphide-containing waste air is passed at temperatures from 50° to 350° C. over a catalyst which is composed, at least on its surface, of at least one metal which, in a 1-molar acidic aqueous solution, has a potential which is at least 200 mV more positive than that of the standard hydrogen electrode.

4 Claims, No Drawings

PROCESS FOR REMOVING HYDROGEN PHOSPHIDE FROM WASTE AIR

The present invention relates to a process for removing hydrogen phosphide from waste air by catalytic oxidation.

When phosphorus or its compounds of a low oxidation state participate in chemical processes taking place at an elevated temperature, hydrogen phosphide ($PH_3$) is formed. Hydrogen phosphide is also formed when alkali metal phosphides or alkaline earth metal phosphides come into contact with moisture, which fact is utilized in pest control, in particular in the field of cereals storage.

Hydrogen phosphide is an oxidation-sensitive and toxic gas which in relatively high concentrations spontaneously ignites in air, whereas it has an astonishingly high stability in a low concentration at room temperature, i.e. below its ignition point. Once released to the environment, it is probably converted photochemically in the latter to oxidation products of phosphorus.

Because of the toxicity of hydrogen phosphide, it has recently been ordained that not more than 1 ppm of $PH_3$ may be present in waste air. Various processes for removing hydrogen phosphide from gases have therefore already been developed.

Thus, German Patent No. 715,678 has disclosed a process for removing hydrogen phosphide from gases, wherein the hydrogen phosphide-containing gas is washed with 80 to 100% sulfuric acid, the regeneration of the sulfuric acid being carried out outside the washing device by means of an oxidizing agent such as hydrogen peroxide, chromic acid or nitric acid, or by means of atmospheric oxygen in the presence of catalysts.

It is also known that hydrogen phosphide is rapidly oxidized with air at temperatures of 800° C. and higher.

Finally, hydrogen phosphide can be adsorbed on porous supports such as activated carbons or molecular sieves. If the porous supports are impregnated with metal salts, for example salts of silver or copper, the hydrogen phosphide is oxidized catalytically (cf. BOGDANOV et al. in "Zhurnal Prikladnoi Khimii", volume 60, No. 5, pages 1119 to 1123, 1987; HALL et al. in "Carbon", volume 23, No. 4, pages 353 to 371, 1985).

In the processes mentioned, it is a disadvantage that they require either continuous maintenance work (drying of the gas mixture before washing with mineral acid) or expensive equipment (energy-intensive special muffle furnaces) or high operating costs (frequent renewal of the porous supports).

It is therefore the object of the present invention to provide a process for removing hydrogen phosphide from waste air, which can be carried out in a simple way at an only slightly elevated temperature with minimum expenditure on equipment. According to the invention, this is achieved by passing the hydrogen phosphide-containing waste air at temperatures from 50° to 350° C., preferably from 150° to 300° C., over a catalyst which is composed, at least on its surface, of at least one metal which, in a 1-molar acidic aqueous solution, has a potential which is at least 200 mV more positive than that of the standard hydrogen electrode.

If desired, the process according to the invention can also be further developed in such a way that (a) the metal having a potential which is at least 200 mV more positive than that of the standard hydrogen electrode is located on a metallic support;

(b) the metallic support is composed of iron or alloys thereof;

(c) the metal having a potential which is at least 200 mV more positive than that of the standard hydrogen electrode has been applied to a non-porous, non-metallic support;

(d) the non-metallic support is composed of a ceramic material;

(e) the metal having a potential which is at least 200 mV more positive than that of the standard hydrogen electrode is copper or an alloy thereof;

(f) the metal having a potential which is at least 200 mV more positive than that of the standard hydrogen electrode is silver;

(g) the metal having a potential which is at least 200 mV more positive than that of the standard hydrogen electrode is gold;

(h) the metal having a potential which is at least 200 mV more positive than that of the standard hydrogen electrode is at least one platinum metal.

By means of the process according to the invention, it is possible to remove hydrogen phosphide with a small maintenance effort even from large volumetric flows.

The process according to the invention ensures reliable removal of hydrogen phosphide from waste air, at low investment costs and operating costs.

Finally, hydrogen phosphide-containing waste air may contain a considerable proportion of water vapor, dust and aerosols without impairing the effectiveness of the process according to the invention.

The advantages achievable by the process according to the invention are demonstrated by reference to Examples 5 to 13.

In the examples, a column was used which had a length of about 40 cm and a diameter of about 30 mm and could be heated from the outside and into which a moistened warm $PH_3$/air mixture at about 40° C. was introduced. The $PH_3$ content was determined at the inlet ($C_{in}$) and at the outlet ($C_{out}$) of the column. The temperature to which the column had been heated was measured on its surface ($T_{shell}$). $T_{out}$ designates the temperature of the gas mixture leaving the column.

Unless otherwise stated, the concentrations were determined successively in the order given at 15 minute intervals.

EXAMPLE 1

Comparison Example

The column was packed with 79.8 g of degreased steel turnings (material number 1.4571 according to DIN 17440, December 1972). 700 l/h of $PH_3$/air mixture were passed through the column.

| | $T_{shell} = 200°$ C. | |
| --- | --- | --- |
| $C_{in}$ [ppm] | $C_{out}$ [ppm] | $T_{out}$ [°C.] |
| 1500 | 1500 | 58 |
| 220 | 220 | 93 |
| 350 | 300 | 91 |

EXAMPLE 2

Comparison Example

Example 1 was repeated, with the modification that 350 l/h of PH$_3$/air mixture were passed through the column.

| $C_{in}$ [ppm] | $C_{out}$ [ppm] | $T_{out}$ [°C.] |
|---|---|---|
| 190 | 150 | 86 |
| 80 | 60 | 77 |

EXAMPLE 3

Comparison Example

Example 2 was repeated with the modification that $T_{shell}$ was raised to 250° C.

| $C_{in}$ [ppm] | $C_{out}$ [ppm] | $T_{out}$ [°C.] |
|---|---|---|
| 70 | 70 | 82 |

EXAMPLE 4

Comparison Example

The column was packed with 50 g of nickel-plated copper wool. 350 l/h of PH$_3$/air mixture were passed through the column.

| $C_{in}$ [ppm] | $C_{out}$ [ppm] | $T_{out}$ [°C.] |
|---|---|---|
| (a) $T_{shell}$ = 150° C. | | |
| 80 | 60 | 61 |
| 520 | 490 | 64 |
| 470 | 440 | 62 |
| (b) $T_{shell}$ = 200° C. | | |
| 430 | 390 | 78 |
| (c) $T_{shell}$ = 250° C. | | |
| 380 | 70 | 92 |
| 380 | 75 | 90 |
| 350 | 60 | 93 |

Note: The improvement in activity from (a) to (c) is evidently based, in addition to the raising of the temperature, on the at least partial oxidation of the nickel layer, whereby the copper surface is partially exposed.

EXAMPLE 5 (According to the Invention)

The column was packed with 75 g of gold-plated steel turnings (steel of material number 1.4571 according to DIN 17440, December 1972).

350 l/h of PH$_3$/air mixture were passed through the column.

| $C_{in}$ [ppm] | $C_{out}$ [ppm] | $T_{out}$ [ppm] |
|---|---|---|
| (a) $T_{shell}$ = 150° C. | | |
| 80 | 50 | 63 |
| 1300 | 700 | 67 |
| 300 | 20 | 58 |
| (b) $T_{shell}$ = 200° C. | | |
| 820 | 80 | 73 |
| 250 | 25 | 73 |
| 320 | 120 | 82 |
| 310 | 100 | 81 |
| 850 | 450 | 83 |
| (c) $T_{shell}$ = 250° C. | | |
| 2000 | 620 | 78 |
| 1400 | 550 | 82 |
| 220 | 60 | 84 |

EXAMPLE 6 (According to the Invention)

The column was packed with 75 g of copper-plated steel turnings (steel of material number 1.4571 according to DIN 17440, December 1972).

350 l/h of PH$_3$/air mixture were passed through the column.

| $C_{in}$ [ppm] | $C_{out}$ [ppm] | $T_{out}$ [ppm] |
|---|---|---|
| (a) $T_{shell}$ = 150° C. | | |
| 75 | 15 | 58 |
| 670 | 420 | 60 |
| 250 | 20 | 65 |
| (b) $T_{shell}$ = 200° C. | | |
| 200 | 25 | 54 |
| 600 | 40 | 70 |
| 820 | 80 | 61 |
| (c) $T_{shell}$ = 250° C. | | |
| 1400 | 230 | 78 |
| 610 | 120 | 88 |
| 100 | 2 | 88 |

EXAMPLE 7 (According to the Invention)

The column was packed with 55.3 g of silver-plated copper wool.

350 l/h of PH$_3$/air mixture were passed through the column.

| $C_{in}$ [ppm] | $C_{out}$ [ppm] | $T_{out}$ [ppm] |
|---|---|---|
| (a) $T_{shell}$ = 150° C. | | |
| 350 | 20 | 51 |
| 380 | 20 | 55 |
| 420 | 30 | 57 |
| 370 | 20 | 56 |
| 3000 | 300 | 56 |
| 700 | 25 | 56 |
| (b) $T_{shell}$ = 200° C. | | |
| 3000 | 25 | 68 |
| 190 | 0.5 | 65 |
| 450 | 11 | 62 |
| 750 | 17 | 58 |
| 1700 | 30 | 53 |
| (c) $T_{shell}$ = 250° C. | | |
| 1200 | 10 | 78 |
| 160 | 0.6 | 80 |
| 580 | 6 | 79 |
| 1900 | 50 | 82 |
| 350 | 1.2 | 80 |

EXAMPLE 8 (According to the Invention)

The column was packed with 50.5 g of degreased copper wool. 350 l/h of PH$_3$/air mixture were passed through the column.

| $C_{in}$ [ppm] | $C_{out}$ [ppm] | $T_{out}$ [ppm] |
|---|---|---|
| (a) $T_{shell}$ = 150° C. | | |
| 210 | 10 | 60 |
| 1500 | 180 | 63 |
| 80 | 0.5 | 68 |
| 650 | 3.5 | 68 |
| 250 | 11 | 70 |
| (b) $T_{shell}$ = 200° C. | | |
| 260 | 0 | 79 |
| 1200 | 0.5 | 78 |
| 420 | 0 | 79 |
| 4000 | 0.2 | 80 |

EXAMPLE 9 (According to the Invention)

Example 8b was repeated with the modification that 700 l/h of $PH_3$/air mixture were passed through the column.

| $C_{in}$ [ppm] | $C_{out}$ [ppm] | $T_{out}$ [ppm] |
|---|---|---|
| 2500 | 15 | 99 |
| 630 | 4 | 98 |
| 130 | 0.2 | 98 |
| 300 | 10 | 95 |
| 320 | 10 | 90 |
| 1000 | 10 | 93 |
| 650 | 10 | 93 |
| 200 | 10 | 95 |

EXAMPLE 10 (According to the Invention)

The column was packed with 240 g of 60/35 copper catalyst in pellet form (HOECHST AG).

350 l/h of $PH_3$/air mixture were passed through the column.

| | $T_{shell}$ = 200° C. | |
|---|---|---|
| in [ppm] | $C_{out}$ [ppm] | $T_{out}$ [ppm] |
| 420 | 0 | 69 |
| 1000 | 0 | 70 |
| 1500 | 0 | 73 |

EXAMPLE 11 (According to the Invention)

Example 10 was repeated with the modification that, at a different shell temperature, 700 l/h of $PH_3$/air mixture were passed through the column.

| | $T_{shell}$ = 150° C. | |
|---|---|---|
| $C_{in}$ [ppm] | $C_{out}$ [ppm] | $T_{out}$ [ppm] |
| 900 | 1 | 89 |
| 400 | 0.1 | 84 |
| 2500 | 80 | 90 |
| 1300 | 12 | 89 |

EXAMPLE 12 (According to the Invention)

The column was packed with 103 g of calcium silicate (Penta 77) having a copper content of 3%.

350 l/h of $PH_3$/air mixture were passed through the column.

| | $T_{shell}$ = 200° C. | |
|---|---|---|
| $C_{in}$ [ppm] | $C_{out}$ [ppm] | $T_{out}$ [ppm] |
| 1150 | 10 | 68 |
| 1350 | 80 | 75 |
| 50 | 30 | 72 |
| 100 | 10 | 61 |

EXAMPLE 13 (According to the Invention)

Example 12 was repeated with the modification that the column was packed with 130 g of calcium silicate (Penta 77) having a copper content of 40%.

The concentrations were determined in the given order at intervals—different from the other examples—of 2 hours.

| $C_{in}$ [ppm] | $C_{out}$ [ppm] | $T_{out}$ [ppm] |
|---|---|---|
| 1100 | 0 | 82 |
| 1200 | 0 | 83 |
| 1200 | 0 | 80 |
| 1200 | 0 | 83 |
| 1200 | 0 | 83 |
| 1400 | 0.5 | 80 |
| 1800 | 3 | 83 |

We claim:

1. A process for removing hydrogen phosphide from waste air by catalytic oxidation, which comprises passing the hydrogen phosphide-containing waste air at temperatures from 50° to 250° C. over a catalyst which is composed, at least on its surface, of a metallic constituent selected from the group consisting of copper, copper alloys, silver, gold and at least one platinum metal, said metallic constituent being located on a metallic support.

2. A process as claimed in claim 1, wherein said metallic support is comprised of iron or alloys thereof.

3. A process for removing hydrogen phosphide from waste air by catalytic oxidation, which comprises passing the hydrogen phosphide-containing waste air at temperatures from 50° to 250° C. over a catalyst which is composed, at least on its surface, of a metallic constituent selected from the group consisting of copper, copper alloys, silver, gold and at least one platinum metal, which metallic constituent has been applied to a non-porous, non-metallic support.

4. A process as claimed in claim 3, wherein said non-porous, non-metallic support comprises a ceramic material.

* * * * *